Patented Oct. 10, 1922.

1,431,166

UNITED STATES PATENT OFFICE.

FRED M. LOCKE, OF VICTOR, NEW YORK.

GLASS.

No Drawing. Application filed September 16, 1916, Serial No. 120,554. Renewed January 21, 1922. Serial No. 531,004.

*To all whom it may concern:*

Be it known that I, FRED M. LOCKE, a citizen of the United States of America, and resident of Victor, in the county of Ontario, in the State of New York, have invented new and useful Improvements in Glass, of which the following, taken in connection with the accompanying drawings, is a full, clear, and exact description.

This invention relates to certain new and useful improvements in glass and glass manufacture.

The object of the invention is to produce a glass of low coefficient of expansion and high stability.

Such qualities are obtained through the combination of silica with boron material, such as boric oxide, and I find that the addition of small amount of an alkali earth such as the metal salts or compounds of barium, strontium, calcium, and magnesium, assists in producing the stability desired and lowers the melting point of the glass composition, rendering the manufacture more economic.

The use of the alkalies, such as sodium or potassium, also lowers the melting point of the glass.

I find that a glass that is high in silica and boric oxide, combined with small amounts of the metals mentioned or some of the compounds of the metals mentioned, and preferably small amounts of alkalies, has a very low coefficient of expansion and the highest stability.

As a specific instance of this invention, I desire to disclose and claim herein a glass of approximately the following analysis:

$SiO_2$ 78%—$B_2O_3$ 15%—$Na_2O$ 4%—
$CaO$ 1%—$K_2O$ 1%—$Al_2O_3$ 1%

A glass of the above analysis is highly efficient for numerous purposes, particularly where a low coefficient of expansion is desired, the specific composition disclosed producing a glass having a coefficient of expansion of approximately .0000035. Such glasses are very valuable for culinary ware, tubing or chemical ware, which is subject to sudden changes of temperature, or to acids or alkalies.

Further, by reason of its composition the glass of this invention is peculiarly adapted for insulating purposes and for the formation of insulators for line conductors or high voltage current.

A batch for making the foregoing glass will consist approximately of 69.50% silica, 20% boric acid, 6% cryolite, 4% sodium nitrate and .5% calcium oxide.

Although I have described and disclosed a specific composition as illustrative of the invention herein, I do not desire to limit myself to the same, as various changes and substitutions may obviously be made in the exact proportions and by way of equivalent materials without departing from the spirit of this invention, as set forth in the appended claims, and although the claims herein are drawn specifically to the combination of elements set forth including calcium, it should be understood that metals of the calcium group, such as magnesium, etc., may be substituted therefor, all within the scope of the claims.

By the use of the expression "low alkali content" in the claims, it is intended that the content shall be 5% or under.

What I claim is:

1. A glass containing silica, boric oxid and an alkali earth, and having a coefficient of expansion not greater than .0000035.

2. A glass containing silica, boric oxid, alumina and an alkali earth, and having a coefficient of expansion not greater than .0000035.

3. A glass containing silica, boric oxid, alumina, an alkali earth, and a small amount of an alkali, and having a coefficient of expansion not greater than .0000035.

4. A glass containing boric oxid, calcium oxid, and a relatively high percentage of silica and having a coefficient of expansion not greater than .0000035.

5. A glass containing boric oxid, alumina, calcium oxid, and a relatively high percentage of silica and having a coefficient of expansion not greater than .0000035.

6. A glass containing boric oxid, alumina, calcium oxid, a small amount of an alkali, and a relatively large percentage of silica, and having a coefficient of expansion not greater than .0000035.

7. A glass of substantially the following analysis:

$SiO_2$ 78%—$B_2O_3$ 15%—$Na_2O$ 4%—
$CaO$ 1%—$K_2O$ 1%—$Al_2O_3$ 1% and having a coefficient of expansion of approximately .0000035.

8. A glass containing not less than 78% of silica, under 5% of alkali, alumina, an alkali earth, and boric oxide.

9. A glass containing a high silica content, under 5% of alkali, alumina, an alkali earth, and boric oxide, and having a coefficient of expansion not greater than .0000035.

10. A boro silicate glass containing an alkali earth and not over 5% of alkali.

11. A boro silicate glass containing an alkali earth, alumina and not over 5% of alkali.

12. A boro silicate glass containing approximately 78% of silica, alumina an alkali earth, and a low alkali content.

13. A boro silicate glass having a high silica content, and containing alumina, an alkali earth and a low alkali content.

14. A boro silicate glass containing approximately 78% of silica, alumina, traces of alkali earth, and not over 5% of alkali.

15. A boro silicate glass containing traces of alkali earth, and low in alkali content.

16. A boro silicate glass containing calcium and low in alkali content.

In witness whereof I have hereunto set my hand this 11th day of September, 1916.

FRED M. LOCKE.